United States Patent Office 3,784,494
Patented Jan. 8, 1974

3,784,494
PROCESS OF PRODUCING ARTIFICIAL LUMBER FROM UNTREATED SAWDUST, A POWDERED UREA-FORMALDEHYDE RESIN AND WATER
Geza Domokos, 312 Ocean Drive,
Miami Beach, Fla. 33139
No Drawing. Filed Mar. 2, 1971, Ser. No. 120,343
Int. Cl. C08g 51/18
U.S. Cl. 260—17.3
3 Claims

ABSTRACT OF THE DISCLOSURE

This is a process for producing a wood product from natural untreated sawdust and a binder. The binder used is a mixture of powdered incompletely cured thermosetting resin, such as urea-formaldehyde resin and a sufficient amount of a curing agent to fully cure the resin at room temperature. During the process, the binder is mixed with sufficient water to form a paste and the paste is then mixed with the sawdust to form a plastic mass. The mass is molded to the desired shape and completely cured at room temperature and low pressure. It also includes the resulting product which is at least as strong as or stronger than natural wood and is non-flammable, non-warping, non-rotting and resistant to vermin, insects and fugus. It is capable of being nailed, sawed and otherwise shaped with the usual wood working tools.

THE INVENTION

This invention relates to a process of producing a low cost artificial lumber or wood product from sawdust and to the resulting product.

Sawdust is a waste material which accumulates in great quantities in saw mills, factories producing wood products, such as furniture, on building sites and in many other places. Disposing of these vast quantities of sawdust has presented difficult problems. It has, heretofore, been customary to accumulate the sawdust in piles and to burn these piles. This method of disposal is very unsatisfactory since it is costly and causes air pollution.

It has also been suggested to utilize the waste sawdust to produce artificial wood products with the aid of a binder. The processes for carrying out these suggestions were, however, found to be impractical for various reasons. Certain of these processes involved a chemical and/ or heat treatment of the sawdust which increased the cost of the product to a point where it could not compete with natural wood. The binders used were not wholly satisfactory because the resulting product did not possess the strength of natural wood and could not be used as a building material. The use of sawdust in molding has, heretofore, been mainly confined to its use as a filler in molding small plastic articles.

OBJECTS OF THE INVENTION

An object of this invention is to produce a low cost artificial lumber or wood product from sawdust suitable for use as a building material, in making furniture and for other purposes for which natural wood has, heretofore, been used. The product may be in the form of a board, a pillar or any other desired form.

A further object of this invention is produce from waste material, such as sawdust, a board, pillar or other form which may be sawed, nailed or otherwise worked with the usual wood working tools.

Another object of this invention is to provide a simple low cost process for producing a wood product, such as a board, pillar or similar article which has a strength at least equal to that of a similar product made of natural wood.

Still another object of this invention is to provide a novel process for producing a wood product such as a board, pillar or similar article which is fire-proof, non-warping, non-rotting and is resistant to termites and other insects, vermin and fungus growth.

Other objects and advantages of this invention will become obvious to persons skilled in the art from the detailed description of the invention given below.

DETAILED DESCRIPTION

According to this invention, a binder, such as "Weldwood," a powdered plastic resin glue, sold by U.S. Plywood, a division of U.S. Plywood-Champion Papers Inc. of New York, N.Y., which is an incompletely cured urea-formaldehyde resin containing a curing agent and a buffer, is mixed with sufficient water to form a light paste. An amount of natural untreated sawdust, approximately equal to the amount of resin used, is thoroughly mixed with the paste to form a soft plastic mass that can be easily shaped without the use of high pressures. The plastic mass is then placed in a form or mold and pressed sufficiently to assume the shape of the form or mold. No high pressure and no high temperature is used in the process.

If a board is to be molded from the soft plastic mass, the mass is spread out to substantially the desired thickness on a lower board of wood and a top board also of wood is placed on the mass. The weight of the top board usually constitutes sufficient pressure to form the plastic mass. However, another board may be placed on the top board to increase the pressure, if found necessary.

The plastic mass is allowed to remain between the boards for about two days before removing. After removal from the form or mold, the molded board is stored and permitted to dry for four more days, at the end of which time the resin is completely cured and the molded board attains its full strength and moisture resistance. During the drying period, the board loses about five-twelfths of its weight due to the evaporation of the excess water.

The entire process, from the mixing to the final curing and drying, is carried out at substantially room temperature—70°–90° F.

If greater strength is desired in the molded board, wire reinforcement may be incorporated therein. This may be done during the molding operation by spreading the plastic mass on the lower form board to about one-half of the desired thickness, placing wires or wire mesh on the spread plastic mass and then spreading more of the plastic mass on the wire until the desired thickness is obtained, and thereafter placing the upper form board on the spread plastic mass.

The form boards are usually easily separated from the molded board. However, if desired, a zinc plate may be interposed either between the lower form board and the plastic mass or between the upper form board and plastic mass or between both form boards and plastic mass to facilitate the separation of the molded board from the form boards.

By the expression "natural untreated sawdust" is meant sawdust as it is produced in the sawmill or elsewhere and has not been modified by either chemical treatment or by heat. The sawdust should be sufficiently dry to be non-caking. If sufficient water is present in the sawdust to impart to it a tendency to cake, it should be dried sufficiently to render it free flowing. This can be accomplished either by air drying or the application of a low heat sufficient only to evaporate the excess water.

The following example illustrates one method of producing a molded wood board according to this invention.

EXAMPLE

To one pound of "Weldwood" plastic resin glue was added one pint of water and mixed until a light smooth paste was obtained. One pound of pine sawdust was then placed in a mixing bowl and the paste poured thereon. The contents of the bowl were thoroughly mixed until the ingredients were uniformly distributed and a soft plastic mass was obtained.

Two pine boards of suitable size were prepared with one smooth surface on each. One of the boards was placed in a horizontal position on a suitable support with the smooth surface uppermost and the plastic mass was spread thereover. The other board was then placed on top of the spread plastic mass with its smooth surface in contact with the mass and pressed down gently and allowed to remain there for two days.

At the end of two days, the form boards were removed and the molded board was found to be perfectly formed and have smooth surfaces. The molded board was then stored for four days, after which it was tested for strength and moisture resistance and it was found that the molded board was stronger than a similar natural pine board. It was also found that the board lost five-twelfths of its weight during the four-day storage period.

While the sawdust used in the above example was pine, any kind of sawdust, such as oak, cypress, redwood, etc. may be used. Oak sawdust gives a marbeled appearance.

The process described in the example was carried out at room temperature which was above 70° F.

The commercial binder, "Weldwood," plastic resin glue which applicant prefers to use in his process, contains, in addition to incompletely cured urea-formaldehyde resin and activating or curing agent, also a buffer, shell flour and wheat flour. The activating agent is an ammonium salt, such as ammonium chloride, which is capable of reacting with the free formaldehyde in the resin to form hexamethylenetetramine and an acid, such as hydrochloric acid, which acid then acts as a catalyst to complete the cure and harden the resin. The buffer, such as tricalcium phosphate is used to control the pH of the resin, the amount of buffer used is such as to prevent the pH from dropping to below about 3. The wheat flour is used as an extender and the shell flour is used to reduce glue-line penetration. The binder contains about 5 pounds of activating agent, 2 to 5 pounds of buffer, 15 pounds of shell flour and 25 pounds of wheat flour for each 100 pounds of the resin.

Wood cellulose degrades and loses fiber strength on aging in contact with acid. The presence of a sufficient amount of the buffer to maintain the acidity at about pH 3 prevents the degradation of the cellulose and the weakening of the fiber of the sawdust during the curing of the resin. The buffer also increases the "shelf-life" of the binder.

While applicant has found that "Weldwood" plastic resin glue when mixed with sawdust and molded as described above produces a wood product having the desired properties, incompletely cured urea-formaldehyde resin in powdered form and mixed with an activating or curing agent and buffer from any other source may be used as the binder in place of the "Weldwood" plastic resin binder.

The proportions of resin, activating agent and buffer, given above, may be varied within certain limits without destroying the effectiveness of the binder. The preferred ratio of binder to sawdust is 1:1, but this may also be varied within certain limits to modify or vary certain of the properties of the novel wood product. The wheat flour and shell flour may under certain circumstances be omitted without materially affecting the properties of the wood product.

From the foregoing description, it appears clear that a low cost process for producing molded artificial lumber or wood products sufficiently strong to be used as building material from waste sawdust is provided since no costly chemical or thermal treatment of the sawdust is required and no costly high pressure and high temperature presses need be used in the process.

It is to be understood that the details of the description given above are for the purpose of illustration only and not for the purpose of limitation. Applicant's invention is limited only by the appended claims.

I claim:

1. A process of producing artificial lumber from sawdust which comprises first forming a paste of a binder comprising powdered incompletely cured urea-formaldehyde resin, an activating agent and a pH buffer, the activating agent being present in an amount sufficient to cause a complete curing of the resin at room temperature, and water, thoroughly mixing natural untreated sawdust with the paste to form a soft, plastic mass having the ingredients uniformly distributed therein, the ratio of binder to sawdust being about 1:1 and molding and curing the mass at low pressure and at a temperature of between about 70° and 90° F.

2. A process of producing artificial lumber as recited in claim 1 wherein the activating agent is ammonium chloride and the pH buffer is tricalcium phosphate.

3. A process of producing artificial lumber as recited in claim 2 wherein the amount of ammonium chloride mixed with the incompletely cured resin is 5 pounds and the amount of pH buffer is 2 to 5 pounds per 100 pounds of resin.

References Cited

UNITED STATES PATENTS

| 3,174,940 | 3/1965 | Lacoste | 260—17.3 |
| 2,446,304 | 8/1948 | Roman | 264—122 |

FOREIGN PATENTS

| 342,723 | 4/1931 | Great Britain | 260—17.3 |

OTHER REFERENCES

Chem. Abst., vol. 74: 100709; Natkina et al., "Production—Sawdust."

U.S. Plywood Information Bulletin, PRG 168, "Weldwood Plastic Resin Glue."

Forest Products, Panshin et al., pp. 156–157 and 243–245.

WILLIAM H. SHORT, Primary Examiner

E. WOODBERRY, Assistant Examiner

U.S. Cl. X.R.

161—168, 215, 261; 264—122